United States Patent
Jeon et al.

(10) Patent No.: US 9,722,266 B2
(45) Date of Patent: Aug. 1, 2017

(54) METHOD FOR CONTROLLING TEMPERATURE OF FUEL CELL SYSTEM

(75) Inventors: Soon Il Jeon, Gyeonggi-do (KR); Sang Uk Kwon, Gyeonggi-do (KR); Heon Joong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1109 days.

(21) Appl. No.: 13/214,407

(22) Filed: Aug. 22, 2011

(65) Prior Publication Data

US 2012/0122004 A1    May 17, 2012

(30) Foreign Application Priority Data

Nov. 17, 2010 (KR) .................. 10-2010-0114233

(51) Int. Cl.
H01M 8/0432 (2016.01)
H01M 8/04828 (2016.01)

(52) U.S. Cl.
CPC ..... H01M 8/04358 (2013.01); H01M 8/0432 (2013.01); H01M 8/04947 (2013.01)

(58) Field of Classification Search
CPC ......... H01M 8/04768; H01M 8/04007; H01M 8/04014; H01M 8/04029; H01M 8/0432; H01M 8/04365; H01M 8/04559; H01M 8/04589; H01M 8/04723; H01M 8/04308; H01M 8/04947
See application file for complete search history.

(56) References Cited

U.S. PATENT DOCUMENTS

| | | | | |
|---|---|---|---|---|
| 6,087,028 A | * | 7/2000 | Goto | 429/435 |
| 7,465,508 B2 | * | 12/2008 | Alp et al. | 429/414 |
| 7,482,080 B2 | * | 1/2009 | Heimburger et al. | 429/425 |
| 2007/0034172 A1 | * | 2/2007 | Miyahara et al. | 123/41.1 |
| 2007/0231643 A1 | * | 10/2007 | Yamaga et al. | 429/23 |

(Continued)

FOREIGN PATENT DOCUMENTS

| | | |
|---|---|---|
| JP | 2004-288516 A | 10/2004 |
| JP | 2006207539 A | 8/2006 |

(Continued)

Primary Examiner — Sarah A Slifka
Assistant Examiner — Brian Ohara
(74) Attorney, Agent, or Firm — Mintz Levin Cohn Ferris Glovsky and Popeo, P.C.; Peter F. Corless

(57) ABSTRACT

The present invention provides a method for controlling the temperature of a fuel cell system by controlling the rotational speeds of a coolant pump and a cooling fan based on the coolant outlet temperature, the amount of heat generated by a fuel cell stack, etc. In particular, the present invention controls the temperature of a fuel cell system by utilizing a controller which receives a coolant outlet temperature from a sensor in a state where a reference temperature for each stage is determined with respect to the coolant outlet temperature and a target rotational speed for each stage is determined based on the coolant outlet temperature. Then the controller performs proportional integral (PI) control with respect to each rotational speed of a coolant pump and a cooling fan at the target rotational speed for each stage determined based on the current coolant outlet temperature detected by the water temperature sensor.

2 Claims, 7 Drawing Sheets

(56) References Cited

U.S. PATENT DOCUMENTS

| | | | |
|---|---|---|---|
| 2008/0124596 A1* | 5/2008 | Kolodziej et al. | 429/24 |
| 2009/0035613 A1* | 2/2009 | Chikugo et al. | 429/13 |
| 2009/0136804 A1* | 5/2009 | Bono | 429/24 |
| 2009/0286111 A1* | 11/2009 | Kolodziej | 429/13 |

FOREIGN PATENT DOCUMENTS

| | | |
|---|---|---|
| JP | 2006228629 A | 8/2006 |
| JP | 2006228630 A | 8/2006 |
| JP | 2006228631 A | 8/2006 |
| JP | 2006230143 A | 8/2006 |

* cited by examiner

TH1 < TH2 < TH3 < TH4 < TH5 < TH6

(a) Prior art (b) Present invention (a) Prior art (b) Present invention

METHOD FOR CONTROLLING TEMPERATURE OF FUEL CELL SYSTEM

CROSS-REFERENCE TO RELATED APPLICATION

This application claims under 35 U.S.C. §119(a) the benefit of Korean Patent Application No. 10-2010-0114233 filed Nov. 17, 2010, the entire contents of which are incorporated herein by reference.

BACKGROUND (a) Technical Field

The present invention relates to a method for controlling the temperature of a fuel cell system. More particularly, it relates to a method for controlling a coolant pump and a cooling fan in a fuel cell system, which can reduce the power consumption of the coolant pump and the cooling fan by optimizing their operations, prevent the occurrence of flooding and dry-out, and improve the performance of the fuel cell system and the water removal efficiency.

(b) Background Art

Recently, automobile manufactures have begun to incorporate fuel cell systems in to automobiles to provide an environmentally friendly hydrogen fuel cell vehicle as an alternative power generation source for consumers. Typically, a fuel cell system includes a fuel cell stack for generating electricity by an electrochemical reaction between reactant gases, a fuel processing system (FPS) for supplying hydrogen as a fuel to the fuel cell stack, an air processing system (APS) for supplying oxygen containing air as an oxidant required for the electrochemical reaction in the fuel cell stack, and a thermal management system (TMS) for removing reaction heat from the fuel cell stack to the outside of the fuel cell system, controlling operation temperature of the fuel cell stack, and performing water management function.

The fuel cell stack generates electricity via an electrochemical reaction between hydrogen and oxygen containing air as the reactant gases, and discharges heat and water as reaction by-products. Therefore, it is necessary to provide a system for maintaining the temperature of the fuel cell stack at an optimal level in the fuel cell system in order to provide for the most efficient processing.

In a typical fuel cell system for a vehicle, a method of circulating water through bipolar plate channels in the fuel cell stack is used for controlling the temperature of the fuel cell stack (e.g., a temperature control system or cooling system).

An example of the temperature control system for the fuel cell system is shown in FIG. 1. As shown in the figure, the temperature control system for the fuel cell system has a radiator 20 and a cooling fan 21 provided to transfer heat from coolant to the outside, a coolant line 31 provided between a fuel cell stack 10 and the radiator 20 such that the coolant is circulated therethrough, a bypass line 32 and a three-way valve 40 provided to bypass the coolant line 31 such that the coolant does not pass through the radiator 20, and a coolant pump 50 provided to pump and transport the coolant through the coolant line 31.

The bypass line 32 is a coolant line branched from the coolant line 31 on the upstream and downstream sides of the radiator 20 to bypass the coolant line 31 such that the coolant does not pass through the radiator 20. The three-way valve 40 functions to selectively control the flow of the coolant between the main line, which is connected to the radiator 20, and the bypass line 32, which is not connected to the radiator 20.

Furthermore, in a fuel cell system hydrogen and air are received from the outside and electricity and water are generated in the fuel cell stack. The water as a by-product of the electrochemical reaction may be in the form of vapor, saturated liquid, ice., etc. according to real-time conditions such as temperature, pressure, etc., and thus the transfer characteristics of water is changed over time. Moreover, this water affects the transfer characteristics of gas and electrons passing through the bipolar plate channels, a gas diffusion layer, a catalyst layer, and an electrolyte membrane. Accordingly, a flooding phenomenon due to an excessive amount of water and a dry-out phenomenon due to a shortage of water coexist in the fuel cell system.

To solve these problems, the temperature control of the fuel cell stack is the core concern, and it is necessary to develop control logic for solving the flooding and dry-out phenomena, while minimizing the power consumption by optimizing the operation of the coolant pump and the cooling fan.

U.S. Pat. No. 6,087,028 describes a method for controlling a coolant pump and a cooling fan to maintain a difference between a coolant inlet temperature and a coolant outlet temperature within a specific temperature range using a temperature distribution detection unit and a load state detection unit.

Here, if the difference between the coolant inlet temperature and the coolant outlet temperature is greater than a predetermined value, the operating voltage of the coolant pump is increased, and if the flow rate of external air detected by an intake air state detection unit is greater than a predetermined value, the flow of the external air into a radiator is restricted (the cooling fan is rotated in a reverse direction).

However, the above method can be implemented when the coolant pump and the cooling fan are operating under severe conditions, which is disadvantageous in terms of fuel efficiency.

Moreover, when the difference between the coolant inlet temperature and the coolant outlet temperature increases during low-temperature operation, it is advantageous in terms of water removal, and thus it is undesirable to restrict the difference between the coolant inlet temperature and the coolant outlet temperature with excessive power consumption in this situation.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for controlling a coolant pump and a cooling fan in a fuel cell system, which can reduce the power consumption of the coolant pump and the cooling fan by optimizing their operations, prevent the occurrence of flooding and dry-out, and improve the performance of the fuel cell system and the water removal efficiency.

In one aspect, the present invention provides a system and method for controlling the temperature of a fuel cell system. More specifically, a coolant outlet temperature is received from a water temperature sensor in a state where a reference temperature for each stage is determined with respect to the coolant outlet temperature and a target rotational speed for each stage is determined based on the coolant outlet temperature. Then a proportional integral (PI) control is performed with respect to each rotational speed of a coolant pump and a cooling fan at the target rotational speed for each stage is determined based on the current coolant outlet temperature detected by the water temperature sensor.

In one embodiment, in performing the PI control, if the coolant outlet temperature is lower than a predetermined lower limit temperature, the rotational speed of the coolant pump is controlled at a minimum rotational speed.

In another embodiment, the present invention further operates the coolant pump if the coolant outlet temperature increases, in a state where a reference value for each stage is determined with respect to a vehicle speed and a reference temperature for each stage is determined with respect to the vehicle speed, and performs proportional integral (PI) control with respect to the rotational speed of the coolant pump at each stage. Furthermore, the operation of the cooling fan is initiated if the coolant outlet temperature is higher than a reference temperature corresponding to the current vehicle speed.

In still another embodiment, the reference temperature for determining the initiation of the operation of the cooling fan is changed with respect to the vehicle speed, and a higher reference temperature is applied as the vehicle speed increases.

In yet another embodiment, the present invention also determines that feed-forward control conditions are satisfied if the amount of heat generated by a fuel cell stack is higher than a predetermined reference value, if the coolant outlet temperature is higher than a predetermined temperature, and if this state continues for a predetermined period of time. Each rotational speed of the coolant pump and the cooling fan is in this case then increased to a maximum value between a PI control value and a feed-forward control value.

In still yet another embodiment, the present invention further determines that feed-forward control cancellation conditions are satisfied if the amount of heat generated by a fuel cell stack is lower than the predetermined reference value, or if the coolant outlet temperature is lower than the predetermined temperature, and if this state continues for a predetermined period of time. In response, the PI control is performed with respect to each rotational speed of the coolant pump and the cooling fan.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
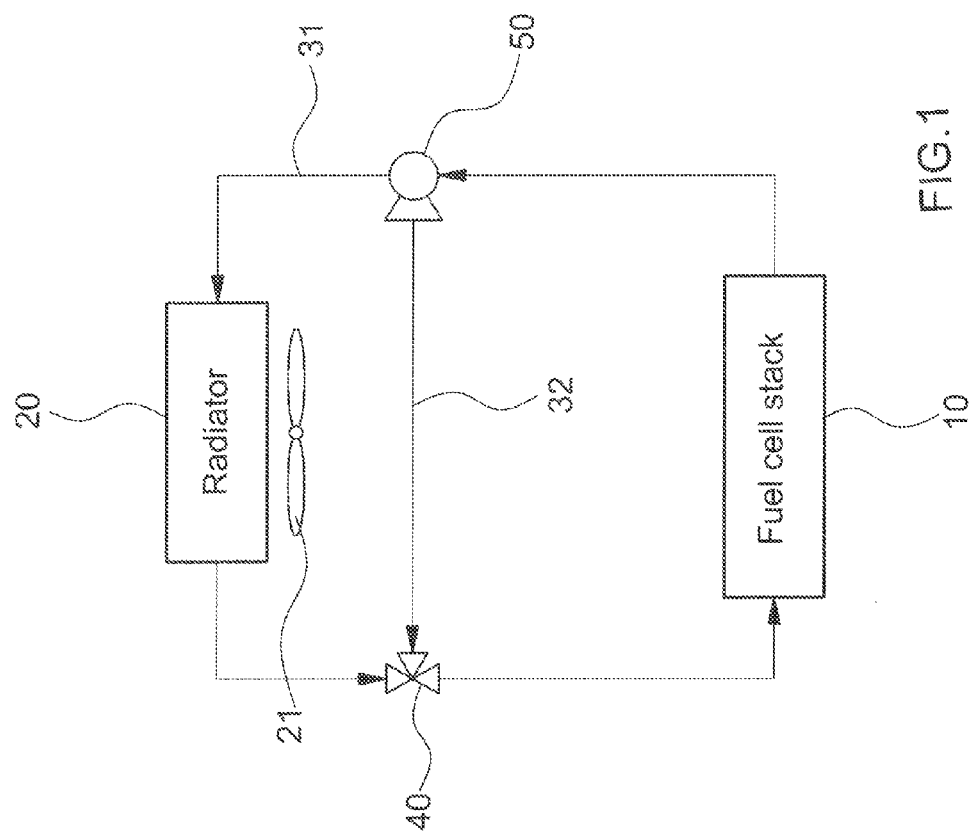
FIG. 1 is a diagram showing the configuration of a typical temperature control system for a fuel cell system.

Reference numerals set forth in the Drawings includes reference to the following elements as further discussed below:

| | |
|---|---|
| 10: fuel cell stack | 20: radiator |
| 21: cooling fan (e.g., radiator fan) | 31: coolant line |
| 32: bypass line | 40: three-way valve |
| 50: coolant pump | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a system and a method for controlling the temperature of a fuel cell system within an appropriate temperature range by controlling the rotational speeds (rpms) of a coolant pump and a blowing mechanism which could be embodied as a cooling fan (e.g., radiator fan) based on the coolant outlet temperature, the vehicle speed, the amount of heat generated by a fuel cell stack, etc.

Moreover, the present invention aims at minimizing the power consumption of the coolant pump and the cooling fan by effectively controlling the coolant pump and the cooling fan and preventing the occurrence of flooding and dry-out in the fuel cell stack.

Figure 2:
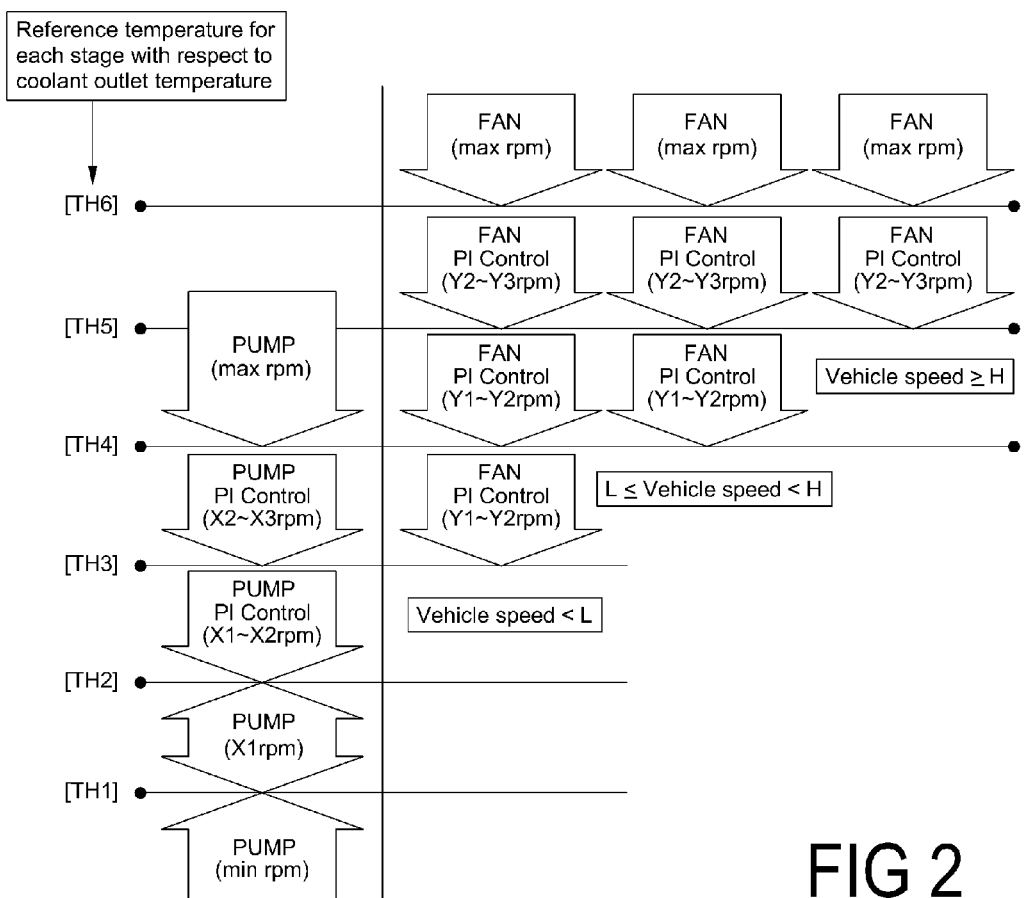
FIG. 2 is a diagram showing a system and method for controlling the temperature of a fuel cell system in accordance with an exemplary embodiment of the present invention.
Figure 3:
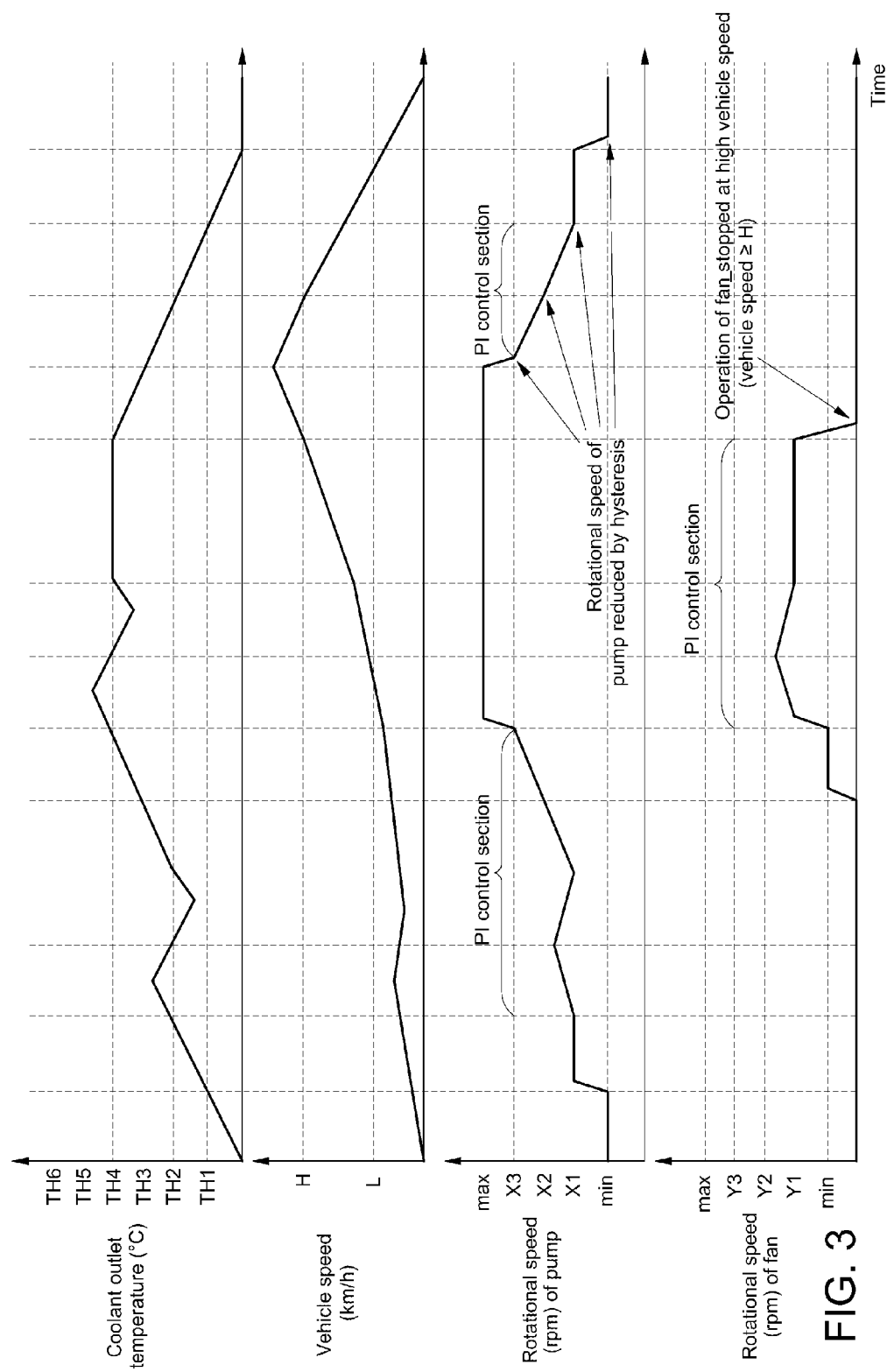
FIGS. 3 and 4 are diagrams showing the states in which a coolant pump and a cooling fan are controlled by the system and method for controlling the temperature of the fuel cell system in accordance with an exemplary embodiment of the present invention.
Figure 4:
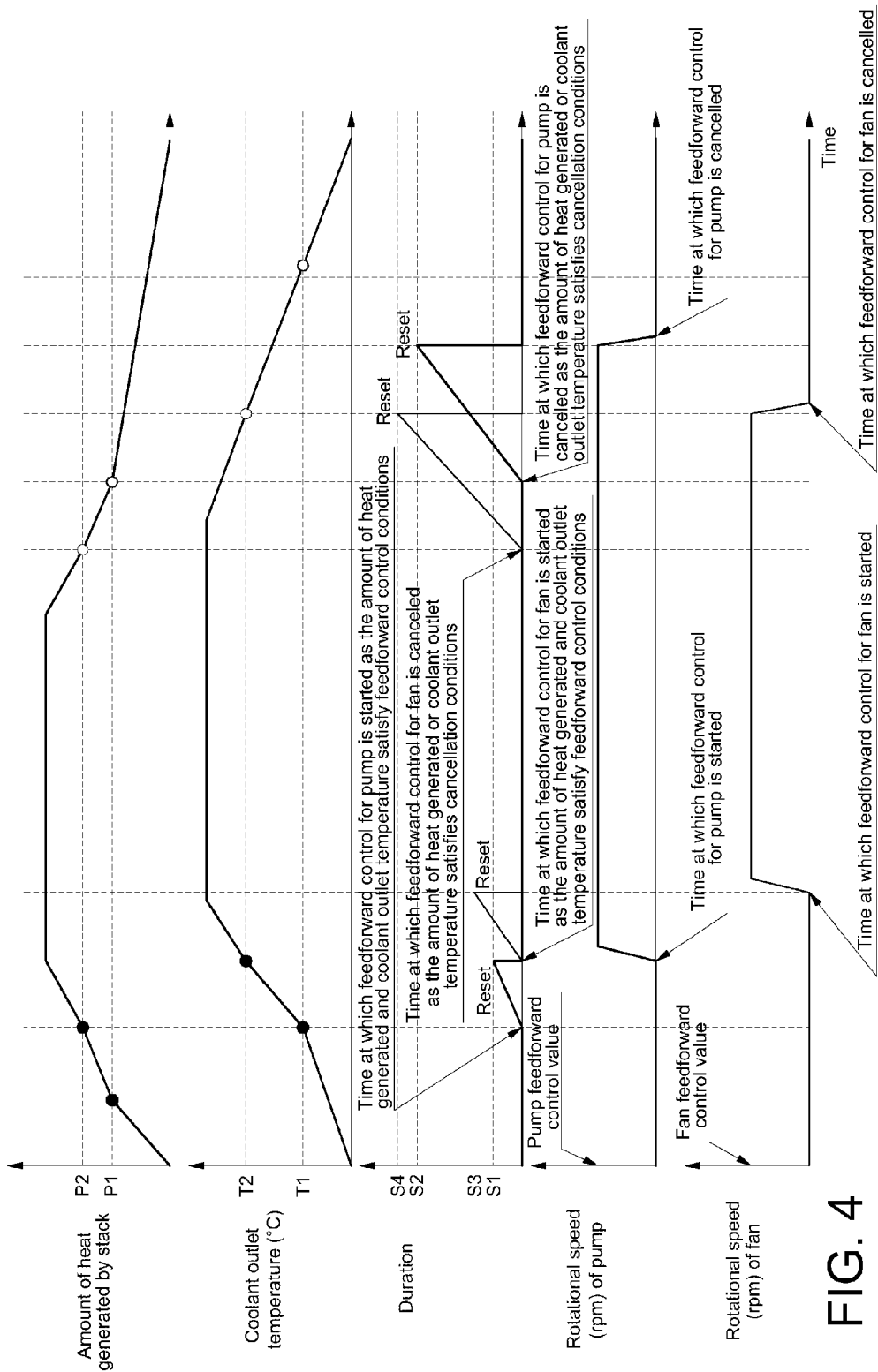

FIG. 2 is a diagram showing a system and a method for controlling the temperature of a fuel cell system in accordance with a preferred embodiment, and FIGS. 3 and 4 are diagrams showing the states in which a coolant pump and a cooling fan are controlled by the method for controlling the temperature of the fuel cell system in accordance with one embodiment.

In the following specification, the coolant outlet temperature of the fuel cell stack represents the coolant temperature detected by a water temperature sensor at a coolant outlet of a fuel cell stack, and the coolant pump and the cooling fan/blowing mechanism will be referred to as a pump and a fan, respectively, for convenience.

Moreover, the subject of control according to the present invention may be a controller for controlling the operation of the pump and the fan in a typical fuel cell vehicle. The control process of the present invention may be performed by any one of a vehicle controller, a fuel cell system controller, a power distribution controller, or under the cooperative control of a plurality of controllers.

For example, the controller performs the control process, which will be described later, based on detection values received from a water temperature sensor and a vehicle speed sensor and based on the amount of heat generated by the fuel cell stack calculated from the operating state of the fuel cell stack.

Also, various methods for calculating the amount of heat generated by the fuel cell stack are well known in the art, and thus a detailed description thereof will be omitted.

First, the system and method for controlling the pump and the fan according to the present invention has the following states.

(1) Control Under Normal Conditions

During normal conditions (i.e., when feed-forward control conditions are not satisfied), in a state where a reference value for each stage (e.g., TH1 to TH6) is determined with respect to the coolant outlet temperature, proportional integral (PI) control based on the current coolant outlet temperature is performed with respect to the rotational speeds (rpm) of the pump and the fan. The PI control performed during normal conditions is to maintain the temperature of the fuel cell stack (i.e., the coolant outlet temperature) below a predetermined level (e.g., 70° C.). Moreover, the operation of the fan is controlled by changing a reference temperature for determining on/off states based on a vehicle speed.

(2) Feed-Forward Control for the Pump and the Fan Based on the Amount of Heat Generated by the Fuel Cell Stack Whether the current operating state of the fuel cell stack satisfies feed-forward control conditions is determined based on the amount of heat generated by the fuel cell stack, the coolant outlet temperature of the fuel cell stack, and the duration. If the feed-forward control conditions are satisfied, each rotational speed of the pump and the fan is increased to a maximum value between a PI control value under normal conditions and a feed-forward control value.

(3) Minimizing the Use of the Pump and the Fan

The operation of the pump is first controlled and the operation of the fan is then controlled to make the best use of associated air intake generated by the vehicle traveling at higher speeds. That is, when the coolant outlet temperature is low, the pump is first operated, and when the coolant outlet temperature increases, the fan is then operated. Moreover, if the coolant outlet temperature is lower than a predetermined lower limit temperature, the rotational speed of the pump is controlled at a minimum rotational speed.

The above-described system and method for controlling the pump and the fan according to the present invention will be described in more detail below.

Referring to FIG. 2, a reference value for each stage (TH1<TH2<TH3<TH4<TH5<TH6) is predetermined with respect to the coolant outlet temperature is shown.

First, the control under normal conditions will be described. In a state where a reference value for each stage is determined with respect to the coolant outlet temperature and a target rotational speed for each stage is determined based on the coolant outlet temperature, the current coolant outlet temperature of the fuel cell stack is detected by the water temperature sensor, and each rotational speed of the pump and the fan is PI controlled at the target rotational speed. The target rotational speed is determined based on the current coolant outlet temperature detected by the water temperature sensor. Thus, the coolant outlet temperature is maintained below a predetermined level (e.g., 70° C.).

During the PI control, if the coolant outlet temperature is lower than a predetermined lower limit temperature (TH1), the rotational speed of the pump is controlled at a minimum rotational speed. Otherwise, if the coolant outlet temperature is higher than a predetermined upper limit temperature (TH4), the rotational speed of the pump is controlled at a maximum rotational speed.

Moreover, during normal conditions, the pump is first operated at a lower rotational speed, and as the coolant outlet temperature increases, the rotational speed of the pump is PI controlled to increase at each stage in which the outlet temperature exceeds a predetermined temperature. Then, if the current coolant outlet temperature is higher than a predetermined reference temperature corresponding to the current vehicle speed (detected by the vehicle speed sensor) in a state where a reference value for each stage is determined with respect to the vehicle speed (for example, vehicle speed<L, L≤vehicle speed<H, or H≤vehicle speed), the operation of the fan is initiated.

Here, the reference temperature for determining the initiation of the operation of the fan is changed with respect to the vehicle speed, and a higher reference temperature is applied as the vehicle speed increases.

For example, if the current vehicle speed is lower than L (vehicle speed<L) and if the current coolant outlet temperature is higher than a reference temperature TH3, the operation of the fan is initiated. If the current vehicle speed is equal to or higher than L and lower than H (L≤vehicle speed<H) and if the current coolant outlet temperature is higher than a reference temperature TH4, the operation of the fan is initiated.

Moreover, during the operation of the fan, if the coolant outlet temperature is lower than a reference temperature TH5 and if the current vehicle speed is equal to or higher than H (H≤vehicle speed), the operation of the fan is stopped.

While the fan is operating, the rotational speed of the fan is PI controlled at a target rotational speed determined based on the current coolant outlet temperature as mentioned above. As such, in the present invention, the pump is first operated when the temperature of the fuel cell stack is low, and if the coolant outlet temperature increases above a reference temperature determined with respect to the vehicle speed for each stage, the operation of the fan is initiated. Especially, a higher reference temperature for initiating the operation of the fan is applied as the vehicle speed increases, and thus it is possible to make the best use of the running wind. As a result, the operating time and power consumption of the fan is reduced, and thus the fuel efficiency can be improved.

When the above-described PI control is performed, hysteresis may be applied to the reference temperature for each stage (TH1 to TH6) with respect to the coolant outlet temperature and the reference value for each stage (L and H) with respect to the vehicle speed.

Moreover, in the present invention, the normal conditions under which the PI control is performed and the feed-forward control conditions under which the feed-forward control is performed are separated from each other such that if the current operating state of the fuel cell stack satisfies the predetermined feed-forward control conditions, each rotational speed of the pump and the fan is controlled at a maximum value between the PI control value under normal conditions and the feed-forward control value.

Here, the feed-forward control for the pump is performed to prevent the dry-out phenomenon caused when the internal temperature of the fuel cell stack rises momentarily during high output (e.g., during acceleration or passing).

These feed-forward control conditions will be described in more detail below. First, to control the operations of the pump and the fan, the controller determines whether the feed-forward control conditions are satisfied based on the current amount of heat generated by the fuel cell stack and the coolant outlet temperature. That is, if the amount of heat/energy generated by the fuel cell stack is higher than a predetermined reference value and if the coolant outlet temperature is higher than a predetermined reference temperature for a predetermined period of time, it is determined that the feed-forward control conditions are satisfied.

For example, with respect to the pump, if the amount of heat generated by the fuel cell stack is higher than a reference value P1 (kW), if the coolant outlet temperature is higher than a predetermined temperature T1 (° C.), and if this state continues for a predetermined period of time S1, it is determined that the feed-forward control conditions for the pump are satisfied.

Likewise, with respect to the fan, if the amount of heat generated by the fuel cell stack is higher than a reference value P2 (kW), if the coolant outlet temperature is higher than a predetermined temperature T2 (° C.), and if this state continues for a predetermined period of time S3, it is determined that the feed-forward control conditions for the fan are satisfied.

On the contrary, the cancellation of the feed-forward control is determined based on the operating state of the fuel cell stack, in which the same variables are used. That is, if any one of the amount of heat generated by the fuel cell stack and the coolant outlet temperature falls below their respective reference/predetermined values for a predetermined period of time, the feed-forward control is cancelled.

That is, with respect to the pump, if either the amount of heat generated by the fuel cell stack is lower than the reference value P1 (kW), or the coolant outlet temperature is lower than the predetermined temperature T1 (° C.), and if this state continues for a predetermined period of time S2, the feed-forward control for the pump is cancelled.

Moreover, with respect to the fan, if either the amount of heat generated by the fuel cell stack is lower than the reference value P2 (kW), or the coolant outlet temperature is lower than the predetermined temperature T2 (° C.), and if this state continues for a predetermined period of time S4, it is determined that the feed-forward control for the fan is cancelled.

When the above-described feed-forward control conditions are satisfied, each rotational speed of the pump and the fan is controlled at an associated value between the PI control value under normal conditions and the feed-forward control value.

Here, the feed-forward control values may be associated map data values or constant values according to the amount of heat generated by the fuel cell stack, the coolant outlet temperature, etc., which are obtained from a previous test.

FIG. 3 shows pump and fan command values under normal conditions where the PI control is performed, and FIG. 4 shows pump and fan command values under feed-forward control conditions, in which when the operating state of the fuel cell stack satisfies the above-described feed-forward control conditions, an associated value between the two control values (such as the PI control value and the feed-forward control value) is used as an actual command value.

Referring to FIG. 3, it can be seen that if the current coolant outlet temperature is lower than a predetermined lower limit (TH1), the rotational speed of the pump is controlled at a minimum rotational speed, and if the current coolant outlet temperature is higher than a predetermined lower limit (TH4), the rotational speed of the pump is controlled at a maximum rotational speed.

Moreover, it can be seen that each rotational speed of the pump and the fan is PI controlled based on the current coolant outlet temperature. In particular, the pump is first initiated/operated at low temperatures, and as the coolant outlet temperature increases above a reference temperature, the fan is initiated/operated and PI controlled. That is, if the vehicle speed is lower than L (vehicle speed<L) and if the coolant outlet temperature is lower than a reference temperature TH3, the fan is not operated and just the pump is operated. If the coolant outlet temperature is higher than a reference temperature (TH4 in FIG. 3) at each vehicle speed, the fan is also operated and PI controlled. If, however, the vehicle speed is equal to or higher than H (vehicle speed≥H), the operation of the fan is stopped.

Moreover, FIG. 4 shows the time at which the feed-forward control for the rotational speed is started as the amount of heat generated by the fuel cell stack and the coolant outlet temperature satisfy the feed-forward control conditions for the pump and the fan (higher than P1 and T1/P2 and T2) and this state continues for a predetermined period of time (S1 or S3).

Furthermore, FIG. 4 shows the time at which the feed-forward control for the rotational speed is canceled as the amount of heat generated by the fuel cell stack or the coolant outlet temperature satisfies the cancellation conditions for the pump and the fan (lower than P1 or T1/P2 or T2) and this state continues for a predetermined period of time (S2 or S4).

In the present invention, the rotational speed of the fan is changed according to the vehicle speed and the reference temperature as mentioned above and, the operating time of the fan is changed according to the vehicle speed. Moreover, although FIGS. 2 and 3 show that the rotational speed of the fan is in a range of Y1 to Y2 (at TH4 to TH5) and in a range of Y2 to Y2 and Y3 (at TH5 to TH6), the rotational speed of the fan may be set in a different range according to the vehicle speed.

For example, if the vehicle speed is lower than L (vehicle speed<L), the rotational speed of the fan may be set in a range of Y2_L to Y3_L. If the vehicle speed is equal to or higher than L and lower than H (L≤vehicle speed<H), the rotational speed of the fan may be set in a range of Y2_M to Y3_M. If the vehicle speed is equal to or higher than H (H≤vehicle speed), the rotational speed of the fan may be set in a range of Y2_H to Y3_H.

Figure 5:
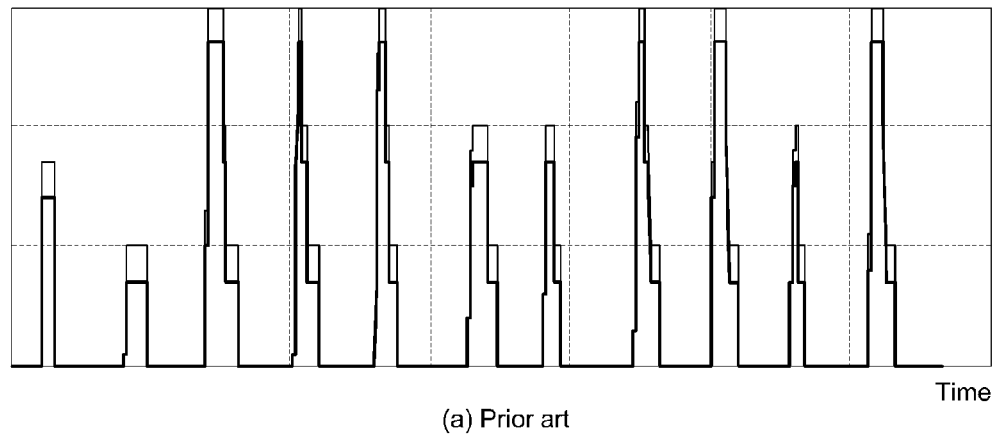
FIGS. 5 to 7 are graphs showing the effects obtained by applying the system and method for controlling the temperature of the fuel cell system in accordance with the exemplary embodiment of the present invention.
Figure 5:
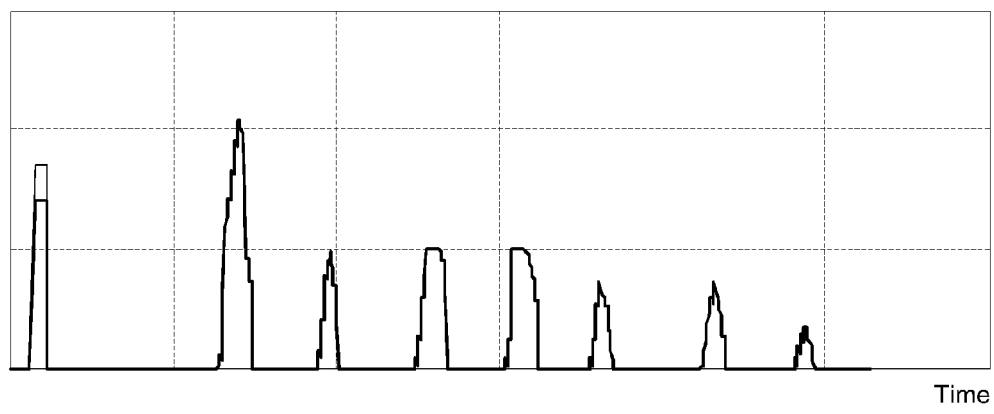
Figure 6:
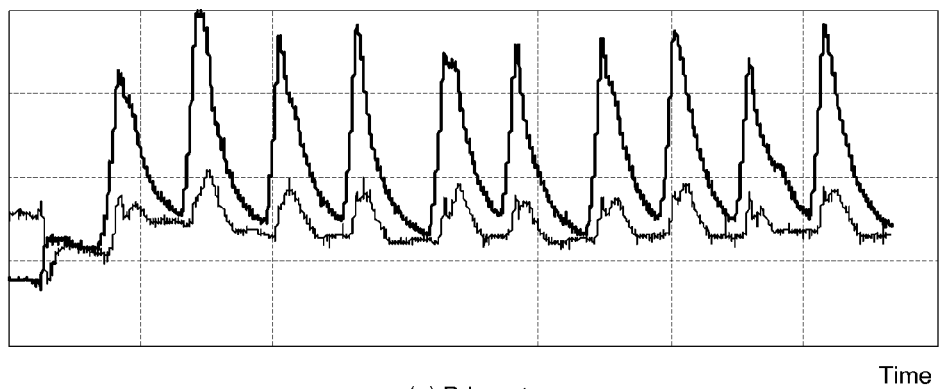
Figure 6:
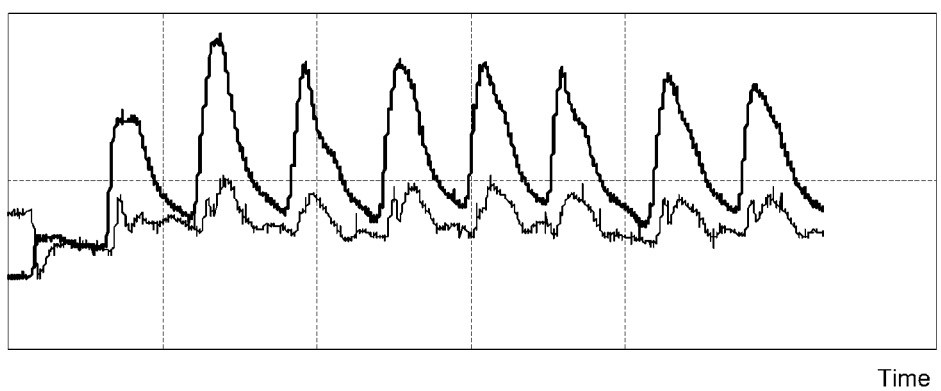
Figure 7:
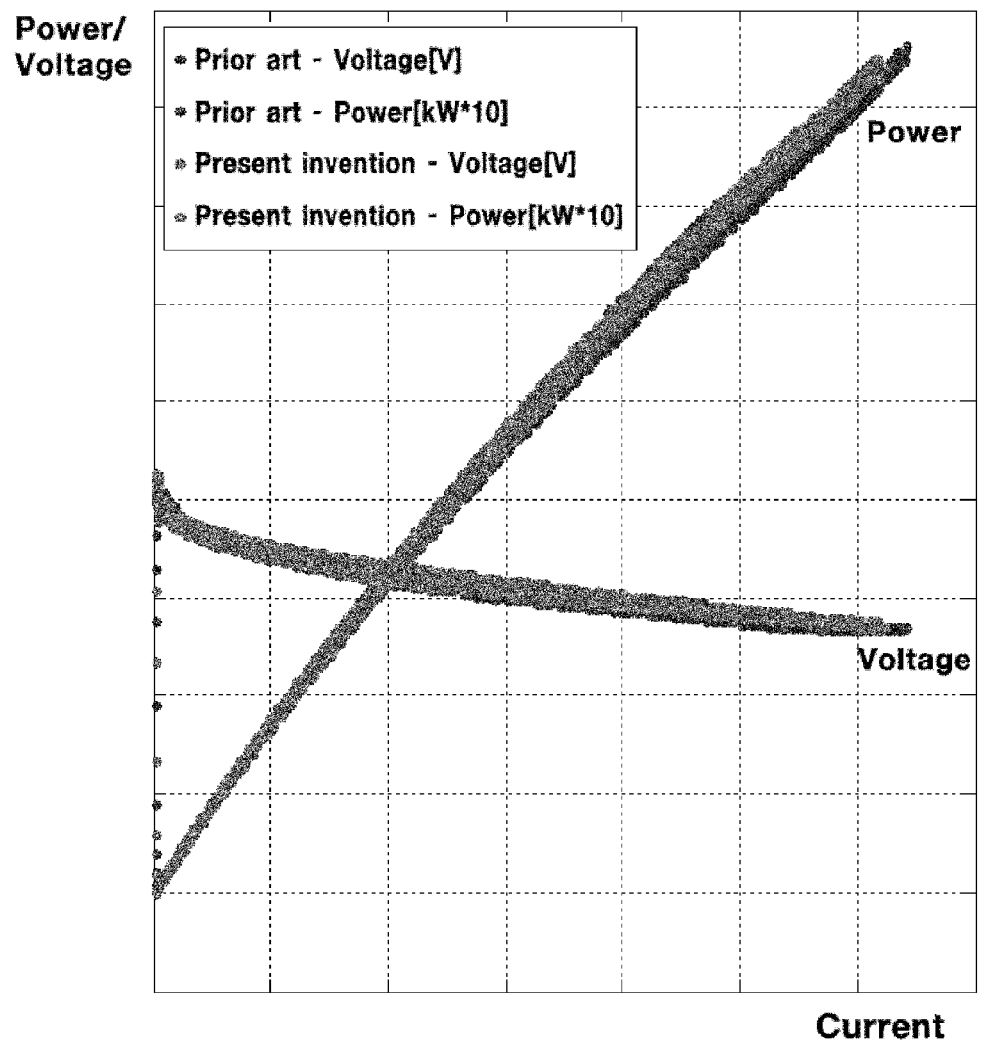

As above, the system and the method for controlling the pump and the fan according to the present invention has been described in detail, and FIGS. 5 to 7 furthermore contain test data (obtained during continuous acceleration from 0 to 100 kph) showing the effects obtained by applying the control method according to the present invention.

As can be seen from FIGS. 5 to 7, according to the present invention, it is possible to reduce the use of the fan (making the best use of the running wind/air intake associated with the driving speed of a vehicle), improve the current-voltage characteristics during high output, and reduce the peak of the coolant outlet temperature.

As described above, according to the method for controlling the temperature of the fuel cell system of the present invention, the PI control is performed based on the reference temperature for each stage with respect to the coolant outlet temperature of the fuel cell stack, in which just the coolant pump is operated when the temperature of the fuel cell stack is low and the cooling fan is then operated when the coolant outlet temperature increases above a reference temperature determined with respect to the vehicle speed for each stage. Moreover, a higher reference temperature for initiating the operation of the cooling fan is applied as the vehicle speed increases, which makes it possible to make the best use of the running wind/air intake due to vehicle speed. Therefore, it is possible to reduce the operating time of the cooling fan and the power consumption, thereby improving the fuel efficiency.

Moreover, during low-temperature operation, the rotational speed of the coolant pump is controlled at a minimum rotational speed, and thus it is possible to improve the performance of the fuel cell system and the water removal efficiency using the difference between the coolant inlet temperature and the coolant outlet temperature (which is advantageous during flooding and cold start-up).

Furthermore, the feed-forward control for the coolant pump and the cooling fan is performed based on the operating stage of the fuel cell stack, and thus it is possible to prevent the dry-out phenomenon caused when the internal temperature of the fuel cell stack rises momentarily during high output (e.g., during acceleration or passing).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the temperature of a fuel cell system, the method comprising:
receiving, at a controller, a coolant outlet temperature from a water temperature sensor in a state where a reference temperature for each stage of a plurality of stages is determined with respect to a vehicle speed and a target rotational speed of a coolant pump and a cooling fan for each stage of the plurality of stages is determined based on the coolant outlet temperature;
performing, by the controller, proportional integral (PI) control with respect to each rotational speed of the coolant pump and the cooling fan at the target rotational speed for each stage of the plurality of stages determined based on the current coolant outlet temperature detected by the water temperature sensor, wherein in performing the PI control, when the coolant outlet temperature is less than a predetermined lower limit temperature, the rotational speed of the coolant pump is controlled at a minimum rotational speed, and when the coolant outlet temperature is greater than a predetermined upper limit temperature, the rotational speed of the pump is controlled at a maximum rotational speed;
operating, by the controller, the coolant pump when the coolant outlet temperature increases; and a reference value determined based on vehicle speed for each stage of the plurality of stages is selected from previously calculated reference values and a reference temperature determined based on vehicle speed for each stage of the plurality of stages is selected from previously calculated reference temperatures, and performing PI control with respect to the rotational speed of the coolant pump at each stage;
then initiating, by the controller, the operation of the cooling fan at each stage when the coolant outlet temperature is greater than a reference temperature that corresponds to the current vehicle speed;
determining that feed-forward control conditions are satisfied to perform feed-forward control, separate from the PI control, if the amount of heat generated by a fuel cell stack is higher than a predetermined reference value, if the coolant outlet temperature is higher than a predetermined temperature, and if this state continues for a predetermined period of time; and
controlling each rotational speed of the coolant pump and the cooling fan at an associated value between a PI control value and a feed-forward control value,
wherein the reference temperature for determining the initiation of the operation of the fan is changed with respect to the vehicle speed such that a higher reference temperature is applied as the vehicle speed increases, in such a manner that when the vehicle speed is lower than L and when the coolant outlet temperature is lower than a reference temperature, the fan is not operated and just the pump is first operated, when the coolant outlet temperature is higher than the reference temperature at each vehicle speed, the fan is operated and PI is controlled, and when the vehicle speed is equal to or higher than H, the operation of the fan is stopped.

2. The method of claim 1, further comprising:
determining that feed-forward control cancellation conditions are satisfied if the amount of heat generated by a fuel cell stack is lower than the predetermined reference value, or if the coolant outlet temperature is lower than the predetermined temperature, and if this state continues for a predetermined period of time; and
performing the PI control with respect to each rotational speed of the coolant pump and the cooling fan.

* * * * *